United States Patent
Whinnett

(10) Patent No.: US 8,005,127 B2
(45) Date of Patent: Aug. 23, 2011

(54) RETRANSMISSION IN A CELLULAR COMMUNICATION SYSTEM

(75) Inventor: Nick W. Whinnett, Marlborough (GB)

(73) Assignee: Motorola Mobility, Inc., Libertyville, IL (US)

( * ) Notice: Subject to any disclaimer, the term of this patent is extended or adjusted under 35 U.S.C. 154(b) by 820 days.

(21) Appl. No.: 12/067,950

(22) PCT Filed: Oct. 31, 2006

(86) PCT No.: PCT/US2006/042462
§ 371 (c)(1),
(2), (4) Date: Mar. 25, 2008

(87) PCT Pub. No.: WO2007/053616
PCT Pub. Date: May 10, 2007

(65) Prior Publication Data
US 2008/0227443 A1 Sep. 18, 2008

(30) Foreign Application Priority Data
Nov. 1, 2005 (GB) .................................. 0522206.2

(51) Int. Cl.
*H04B 1/00* (2006.01)
(52) U.S. Cl. ........................................................ 375/141
(58) Field of Classification Search .................. 375/141, 375/260
See application file for complete search history.

(56) References Cited

U.S. PATENT DOCUMENTS

| | | | |
|---|---|---|---|
| 5,323,421 | A | 6/1994 | LaRosa et al. |
| 6,081,531 | A | 6/2000 | Haber |
| 6,631,127 | B1 | 10/2003 | Ahmed et al. |
| 2001/0001616 | A1 | 5/2001 | Rakib et al. |
| 2002/0196754 | A1 | 12/2002 | Lugil et al. |
| 2003/0139139 | A1 | 7/2003 | Onggosanusi et al. |
| 2004/0255040 | A1 | 12/2004 | Lopes et al. |
| 2004/0264609 | A1 | 12/2004 | Santhoff et al. |
| 2006/0034285 | A1* | 2/2006 | Pirskanen et al. ............ 370/394 |
| 2006/0179390 | A1* | 8/2006 | Tirkkonen et al. ............ 714/748 |
| 2006/0182185 | A1* | 8/2006 | Horiguchi ..................... 375/241 |
| 2008/0285691 | A1* | 11/2008 | Onggosanusi et al. ....... 375/346 |
| 2011/0051856 | A1* | 3/2011 | Fukuoka et al. .............. 375/340 |

\* cited by examiner

*Primary Examiner* — Don N Vo

(57) ABSTRACT

An apparatus comprises a detection processor (203) for detecting retransmission feedback messages in response to a detection threshold. A threshold processor (207) determines the detection threshold in response to a noise estimate generated by a noise processor (209). The noise processor comprises a sub-symbol generator (211) which divides a retransmission feedback symbol into a plurality of sub-symbols. Each of the sub-symbols is despread by a spreading code with a lower spreading factor than a spreading factor of the retransmission feedback symbol. A difference generator (213) then generates difference symbol values between the plurality of sub-symbols and a noise estimator (215) generates the noise estimate in response to the difference symbol values, for example by determining the variance of the difference symbol values. An improved noise estimate may be determined resulting in improved detection performance and thus improved retransmission performance.

10 Claims, 3 Drawing Sheets

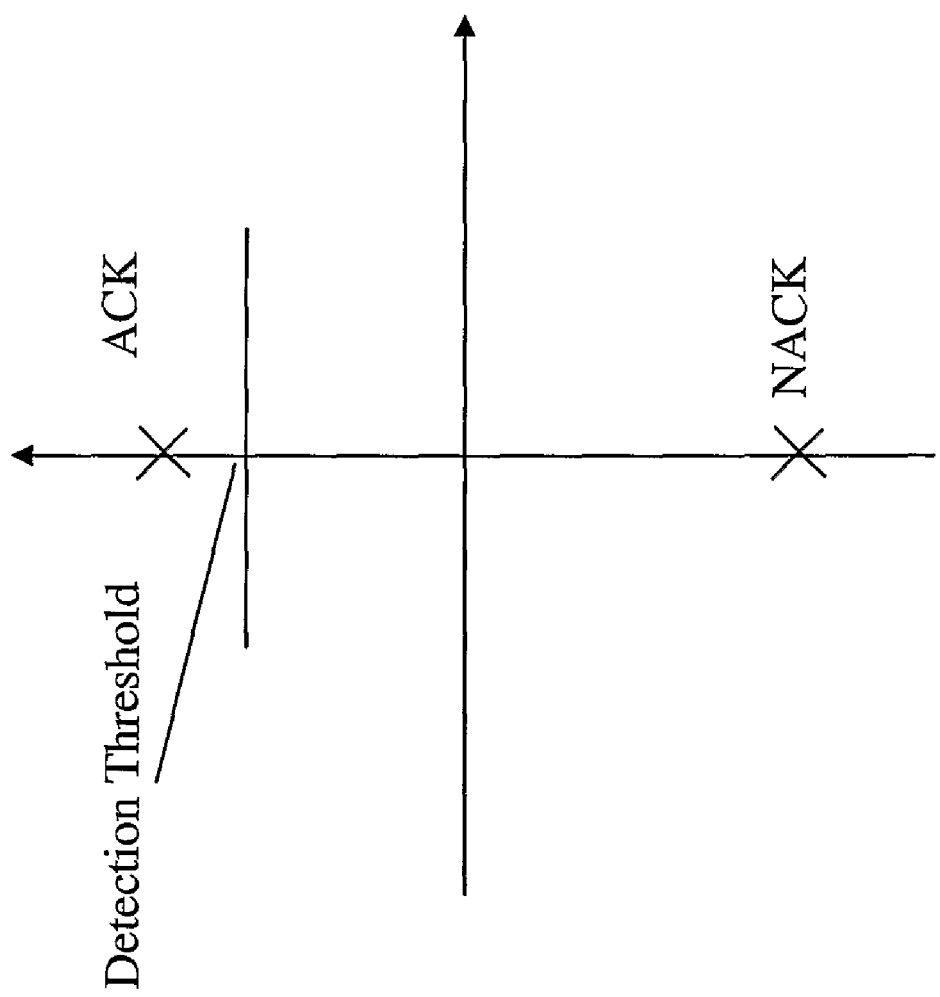

RETRANSMISSION IN A CELLULAR COMMUNICATION SYSTEM

FIELD OF THE INVENTION

The invention relates to retransmission in a cellular communication system and in particular, but not exclusively to retransmission in a $3^{rd}$ Generation Cellular communication system.

BACKGROUND OF THE INVENTION

In a cellular communication system, a geographical region is divided into a number of cells served by base stations. The base stations are interconnected by a fixed network which can communicate data between the base stations. A mobile station is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

The most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users in a similar way to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system. The RAN is operable to support wireless user equipment over a radio link of the air interface. The RAN comprises the base stations, which in UMTS are known as Node Bs, as well as Radio Network Controllers (RNCs) which control the base stations and the communication over the air interface.

The RNC performs many of the control functions related to the air interface including radio resource management and routing of data to and from appropriate base stations. It further provides the interface between the RAN and the core network. An RNC and associated base stations are collectively known as a Radio Network Subsystem (RNS).

3rd generation cellular communication systems have been specified to provide a large number of different services including efficient packet data services. For example, downlink packet data services are supported within the $3^{rd}$ Generation Partnership Project (3GPP) release 5 Technical Specifications in the form of the High Speed Downlink Packet Access (HSDPA) service.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station (also known as the Node-B for UMTS) is responsible for allocating and distributing the HSDPA resources amongst the individual calls. In a UMTS system that supports HSDPA, some of the code allocation is performed by the RNC whereas other code allocation, or more specifically, scheduling is performed by the base station. Specifically, the RNC allocates a set of resources to each base station, which the base station can use exclusively for high speed packet services. The RNC furthermore controls the flow of data to and from the base stations. However, the base station is responsible for scheduling HS-DSCH transmissions to the mobile stations that are attached to it, for operating a retransmission scheme on the HS-DSCH channels, for controlling the coding and modulation for HS-DSCH transmissions to the mobile stations and for transmitting data packets to the mobile stations.

HSDPA seeks to provide packet access techniques with a relatively low resource usage and with low latency. Specifically, HSDPA uses a number of techniques in order to reduce the resource required to communicate data and to increase the capacity of the communication system. These techniques include Adaptive Coding and Modulation (AMC), retransmission with soft combining and fast scheduling performed at the base station.

HSDPA specifically employs a retransmission scheme known as Hybrid Automatic Repeat reQuest (H-ARQ). In the H-ARQ scheme incremental redundancy is provided by a use of soft combining of data from the original transmission and any retransmissions of a data packet. Thus, when a receiver receives a retransmission, it combines the received information with information from any previous transmission of the data packet. The retransmissions may comprise retransmissions of the same channel data or different channel data may be transmitted. For example, retransmissions may comprise additional redundant data of a Forward Error Correcting (FEC) scheme. The additional encoding data may be combined with encoded data of previous transmissions and a decoding operation may be applied to the combined data. Hence, the retransmission may effectively result in a lower rate (higher redundancy) encoding of the same information data.

When a mobile station is involved in an HSDPA service, a number of control messages are transmitted from the mobile station to the single base station supporting the HSDPA service. For example, the mobile station may transmit retransmission acknowledge messages (Hybrid ARQ ACK/NACK messages) and indications of the quality of the communication channel (CQI—Channel Quality Indicators). These messages are transmitted on an HSDPA uplink control channel known as the HS-DPCCH (High Speed-Dedicated Physical Control CHannel).

Erroneous reception of HS-DPCCH may degrade the performance and efficiency of HSDPA services significantly. For example, any errors in the retransmission messages (the ACK/NACK messages) transmitted on the HS-DPCCH degrade the retransmission scheme resulting in reduced efficiency and increased resource consumption. Therefore, it is important for the retransmission feedback to be correctly received.

Specifically, ACK/NACK feedback for a data packet occupies one or multiple timeslots of the HS-DPCCH depending on whether repetition of the ACK/NACK message is applied or not. The ACK/NACK message is an uncoded binary value (mapped to +/−1) that occupies the entire timeslot by repetition over 10 symbols each having spreading factor 256 i.e. the effective spreading factor is equal to the number of chips in the slot which is 2560.

A non-zero detection threshold is typically employed for ACK/NACK detection in order to reduce the probability of detecting a non-transmission or a NACK message as an ACK message. This is desirable since, unlike the false detection of a NACK message which simply results in an additional HARQ re-transmission, the false detection of an ACK message means that the base station will not re-transmit a packet to a user equipment which has previously detected the packet in error. Hence, higher layer procedures (Radio Link Control procedures) are required to recover from false detection of ACK messages. However, these higher layer procedures are generally inefficient.

The ideal detection threshold is a function of the noise power on the ACK/NACK soft values. However, known methods for determining suitable thresholds for detecting retransmission feedback messages tend to be impractical and inaccurate and tend to lead to suboptimal detection performance in many scenarios.

Hence, an improved system for operating a retransmission scheme would be advantageous and in particular a system allowing increased flexibility, improved implementability, improved detection of retransmission feedback messages, reduced error rates, reduced resource consumption and/or improved retransmission performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided an apparatus for operating a retransmission scheme in a cellular communication system, the apparatus comprising: means for receiving a retransmission feedback message on a first channel, the retransmission feedback message comprising at least one retransmission feedback symbol spread by a first spreading code having a first spreading factor; means for generating a noise estimate for the retransmission feedback symbol; threshold means for determining a detection threshold in response to the noise estimate; and determining means for determining if the received retransmission feedback message is a retransmission request in response to the detection threshold;

and wherein the means for generating the noise estimate comprises: sub-symbol generation means for dividing the retransmission feedback symbol into a plurality of sub-symbols, each sub-symbol being despread by a second spreading code having a second spreading factor smaller than the first spreading factor, difference means for generating difference symbol values between the plurality of sub-symbols, and estimate means for generating the noise estimate in response to the difference symbol values.

The invention may allow improved retransmission performance and/or facilitated retransmission operation. Specifically, the invention may allow improved accuracy of the detection of retransmission feedback messages. An improved noise estimate may be used to provide an improved detection threshold adapted to the current conditions. A facilitated operation may be achieved in many embodiments and/or a reduced complexity can be achieved. The noise estimate may be generated using efficient operations and in particular may be generated without use of channel estimates of the propagation channel of the first channel.

It will be appreciated that multiple detection thresholds may be determined in this matter and may for example be used to determine between a plurality of possible values of the retransmission feedback message and/or to determine between a retransmission request feedback, an acknowledge feedback or a non-transmission feedback (DTX message)

The retransmission feedback message may comprise one or more retransmission acknowledgement or non-acknowledgement (ACK/NACK) symbols.

According to an optional feature of the invention, the determining means is arranged to combine the sub-symbols to a combined feedback symbol and to compare the combined feedback symbol to the detection threshold.

The received feedback symbol may be determined as an acknowledgement symbol or a non-acknowledgement symbol in response to the comparison of the combined feedback symbol and the detection threshold. The feature may allow improved and/or facilitated detection of retransmission feedback symbols.

According to an optional feature of the invention, the difference means is arranged to determine the difference symbol values as difference values between adjacent sub-symbols of the received feedback symbol.

This may allow improved and/or facilitated determination of the noise estimate and thus detection of retransmission feedback symbols.

According to an optional feature of the invention, the estimate means is arranged to determine a variance indication for the difference symbol values and to determine the noise estimate in response to the variance indication.

This may allow improved and/or facilitated determination of the noise estimate and thus improved detection of retransmission feedback symbols. In particular, the variance indication is a good representation of the noise of the first channel and thus results in an improved detection threshold and thus improved accuracy of the detection of the received retransmission feedback message. The variance indication may be any indication of the degree of variation of the sub-symbols and may particular be a statistical variance of the difference symbol values.

According to an optional feature of the invention, the threshold means is arranged to determine the detection threshold by scaling of the variance indication.

This may allow a practical and high performance means for adapting the operation to the desired performance. In particular, it may allow a practical way of adjusting the trade-off between the probabilities of wrong detection of acknowledgement and non-acknowledgement messages respectively.

According to an optional feature of the invention, the first spreading code is orthogonal to a sequence of alternating sign inverted second spreading codes.

This may allow a facilitated and/or improved determination of the noise estimate and thus improved detection of retransmission feedback symbols. In particular, it may allow interference reduction without requiring complex interference reduction techniques.

According to an optional feature of the invention, a sequence of alternating sign inverted second spreading codes is orthogonal to spreading codes used for other channels of a user equipment of the first channel.

This may allow a facilitated and/or improved determination of the noise estimate and thus improved detection of retransmission feedback symbols. In particular, it may allow interference reduction without requiring complex interference reduction techniques.

According to an optional feature of the invention, the sub-symbol generation means is arranged to generate sub-symbols for other symbols of the first channel than retransmission feedback symbols.

This may improve the accuracy and reliability of the noise estimate and may thus provide an improved detection threshold and thus improved detection of the retransmission feedback symbol. The other symbols may be other symbols than retransmission acknowledgement/non-acknowledgement symbols and may specifically be other control or signaling symbols transmitted on the first channel.

According to an optional feature of the invention, the other symbols consist in a given number of symbols of the first channel preceding the retransmission feedback message.

The other symbols may for example be a number of symbols of the first channel immediately preceding the retransmission feedback message. The feature may allow improved noise estimation without introducing a further delay in the detection of the received feedback symbol.

According to an optional feature of the invention, the sub-symbol generation means is arranged to generate sub-symbols for a plurality of received retransmission feedback symbols of the retransmission feedback message and the estimate means is arranged to generate the noise estimate in response to the difference symbol values for the sub-symbols of the plurality of received retransmission feedback symbols.

The noise estimate may for example be generated over a number of repetitions of the same received retransmission feedback symbols in the same time slot. The feature may allow improved accuracy and reliability of the noise estimate and thus improved detection of the retransmission feedback symbol.

According to an optional feature of the invention, the threshold means is arranged to determine the detection threshold for one retransmission feedback message in response to noise estimates for a plurality of retransmission feedback messages in different time slots.

The feature may allow improved accuracy and reliability of the detection threshold and thus improved detection of the retransmission feedback symbol. A noise estimate may for example be generated individually for the plurality of retransmission feedback messages and a combined noise estimate may be generated by averaging of the plurality of noise estimates. The average noise estimate may be used for determining the detection threshold.

According to an optional feature of the invention, the first channel is an uplink channel.

The invention may allow improved performance for detection of retransmission feedback symbols on an uplink channel and may thus improve retransmission performance for a downlink channel.

According to an optional feature of the invention, the cellular communication system is a $3^{rd}$ Generation cellular communication system.

The $3^{rd}$ Generation cellular communication system may be a Universal Mobile Telecommunication System (UMTS). The invention may allow particularly advantageous performance for a $3^{rd}$ Generation cellular communication system.

According to an optional feature of the invention, the retransmission scheme is a High Speed Downlink Packet Access (HSDPA) retransmission scheme.

The invention may allow particularly advantageous performance for an HSDPA service by improving detection of ACK/NACK messages for the retransmission scheme. Thereby an improved performance of the whole HSDPA service can be achieved.

According to an optional feature of the invention, the first channel is a High Speed-Dedicated Physical Control CHannel (HS-DPCCH).

The invention may allow particularly advantageous performance for an HSDPA service by improving detection of ACK/NACK messages for the retransmission scheme. Thereby an improved performance of the whole HSDPA service can be achieved.

According to an optional feature of the invention, the retransmission scheme is a Hybrid ARQ retransmission scheme.

The invention may allow particularly advantageous performance for a Hybrid ARQ retransmission scheme by improving detection of retransmission feedback messages.

According to another aspect of the invention, there is provided a cellular communication system comprising an apparatus for operating a retransmission scheme, the apparatus comprising: means for receiving a retransmission feedback message on a first channel, the retransmission feedback message comprising at least one retransmission feedback symbol spread by a first spreading code having a first spreading factor; means for generating a noise estimate for the retransmission feedback symbol; threshold means for determining a detection threshold in response to the noise estimate; and determining means for determining if the received retransmission feedback message is a retransmission request in response to the detection threshold; and wherein the means for generating the noise estimate comprises: sub-symbol generation means for dividing the retransmission feedback symbol into a plurality of sub-symbols, each sub-symbol being despread by a second spreading code having a second spreading factor smaller than the first spreading factor, difference means for generating difference symbol values between the plurality of sub-symbols, and estimate means for generating the noise estimate in response to the difference symbol values.

According to another aspect of the invention, there is provided a method of operating a retransmission scheme in a cellular communication system, the method comprising: receiving a retransmission feedback message on a first channel, the retransmission feedback message comprising at least one retransmission feedback symbol spread by a first spreading code having a first spreading factor; generating a noise estimate for the retransmission feedback symbol; determining a detection threshold in response to the noise estimate; and determining if the received retransmission feedback message is a retransmission request in response to the detection threshold; and wherein generating the noise estimate comprises: dividing the retransmission feedback symbol into a plurality of sub-symbols, each sub-symbol being despread by a second spreading code having a second spreading factor smaller than the first spreading factor, generating difference symbol values between the plurality of sub-symbols, and generating the noise estimate in response to the difference symbol values.

According to another aspect of the invention, there is provided a computer program product enabling the carrying out of a method as described above.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 3 illustrates an example of a constellation diagram for a retransmission feedback symbol.

DETAILED DESCRIPTION OF SOME EMBODIMENTS OF THE INVENTION

The following description focuses on embodiments of the invention applicable to a UMTS cellular communication system. However, it will be appreciated that the invention is not limited to this application but may be applied to many other cellular communication systems.

Figure 1:
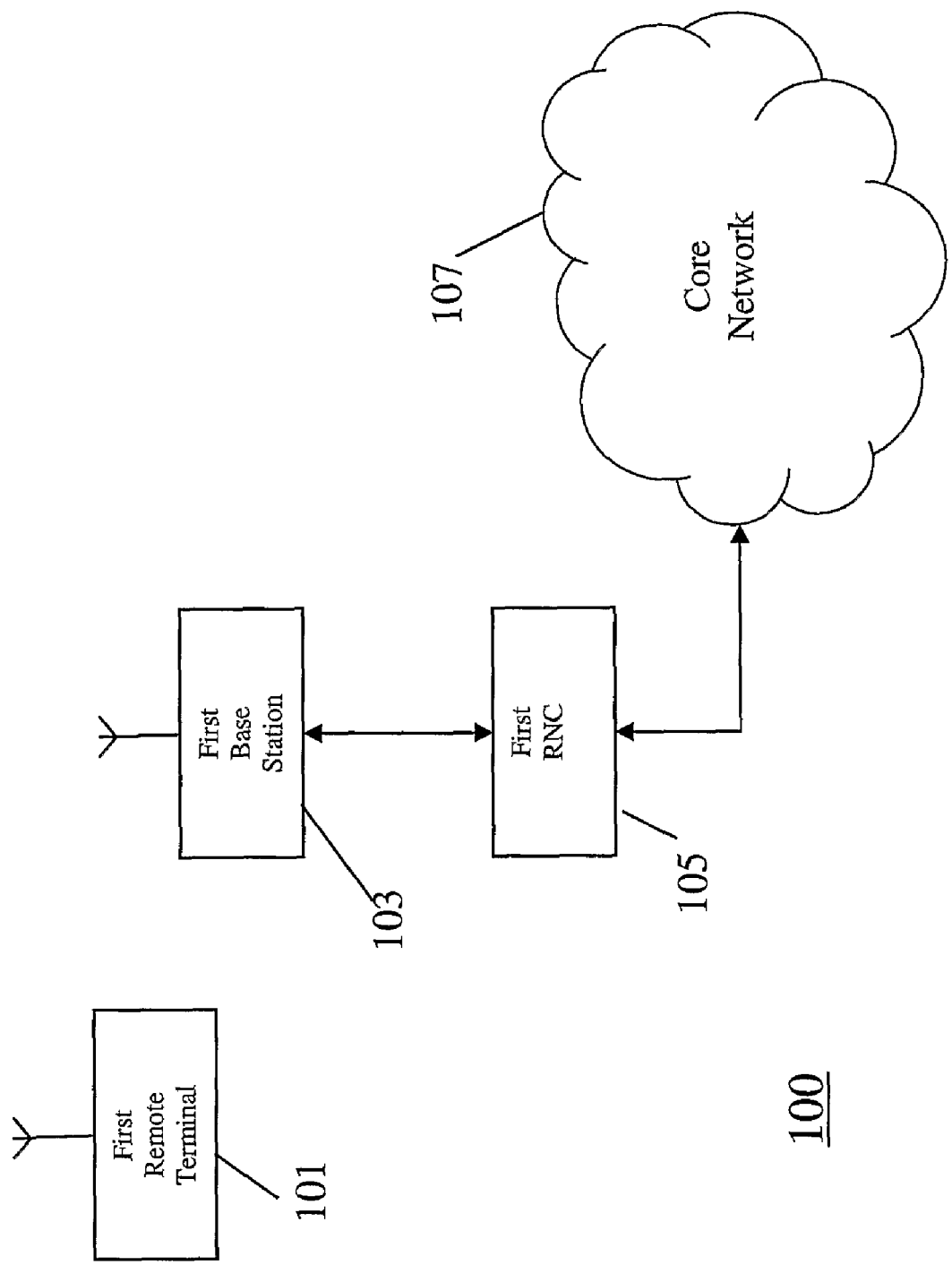
FIG. 1 illustrates an example of a cellular communication system in accordance with some embodiments of the invention.

FIG. 1 illustrates an example of a cellular communication system 100 in which embodiments of the invention may be employed.

In the example of FIG. 1, a first remote terminal 101 is in a first cell supported by a first base station 103. The first remote terminal 101 may e.g. be a user equipment such as a 3rd Generation User Equipment (UE), a communication unit, a subscriber unit, a mobile station, a communication terminal, a personal digital assistant, a laptop computer, an embedded communication processor or any physical, functional or logical communication element which is capable of communicating over the air interface of the cellular communication system.

The first base station 103 is coupled to a first RNC 105. An RNC performs many of the control functions related to the air interface including radio resource management and routing of data to and from appropriate base stations.

The first RNC 105 is coupled to a core network 107. A core network interconnects RNCs and is operable to route data between any two RNCs, thereby enabling a remote terminal in a cell to communicate with a remote terminal in any other cell. In addition, a core network comprises gateway functions for interconnecting to external networks such as the Public Switched Telephone Network (PSTN), thereby allowing remote terminals to communicate with landline telephones and other communication terminals connected by a landline. Furthermore, the core network comprises much of the functionality required for managing a conventional cellular communication network including functionality for routing data, admission control, resource allocation, subscriber billing, remote terminal authentication etc.

In the specific example of FIG. 1, the first remote terminal 101 supports an active HSDPA service. Thus, the first remote terminal 101 receives downlink data from the first base station 103 on the HSDPA shared downlink user channel HS-DSCH (High Speed-Downlink Shared CHannel) and transmits uplink HSDPA control information on the uplink HSDPA control channel HS-DPCCH (High Speed-Dedicated Physical Control CHannel). Whereas the HS-DSCH is shared between different HSDPA users, the HS-DPCCH is dedicated to the individual user equipment.

The downlink HSDPA communication on the HS-DSCH uses a Hybrid ARQ retransmission scheme for reducing the error rate. The first remote terminal 101 receives the transmissions from the first base station 103 and performs an error check. When a data packet is successfully received, the first remote terminal 101 transmits an acknowledge message (ACK message) and if the data packet is received in error a non-acknowledgement message is transmitted (a NACK message) and if no data packet is detected no message is transmitted. If the first base station 103 receives a no message (DTX) or a NACK message from the first remote terminal 101, it proceeds to retransmit data for the data packet. The retransmission data can in a Hybrid ARQ scheme be additional redundant data of the data packet or other information that can be combined with the earlier transmissions to increase the probability of correct detection.

In UMTS HSDPA, the ACK/NACK messages are transmitted from the first remote terminal 101 to the first base station 103 on the HS-DPCCH. In order to achieve high-performance of the retransmission scheme, it is essential that the retransmission ACK/NACK feedback messages are decoded with a very low error probability.

The HSDPA ACK/NACK message is an uncoded binary value (mapped to +/−1) that occupies an entire timeslot by repetition over 10 symbols each having spreading factor 256 i.e. the effective spreading factor is equal to the number of chips in the slot which is 2560. In some cases a retransmission feedback message may be repeated in different timeslots and thus the same ACK/NACK message may be transmitted in a plurality of timeslots corresponding to a higher accumulated spreading factor than 2560.

Figure 2:
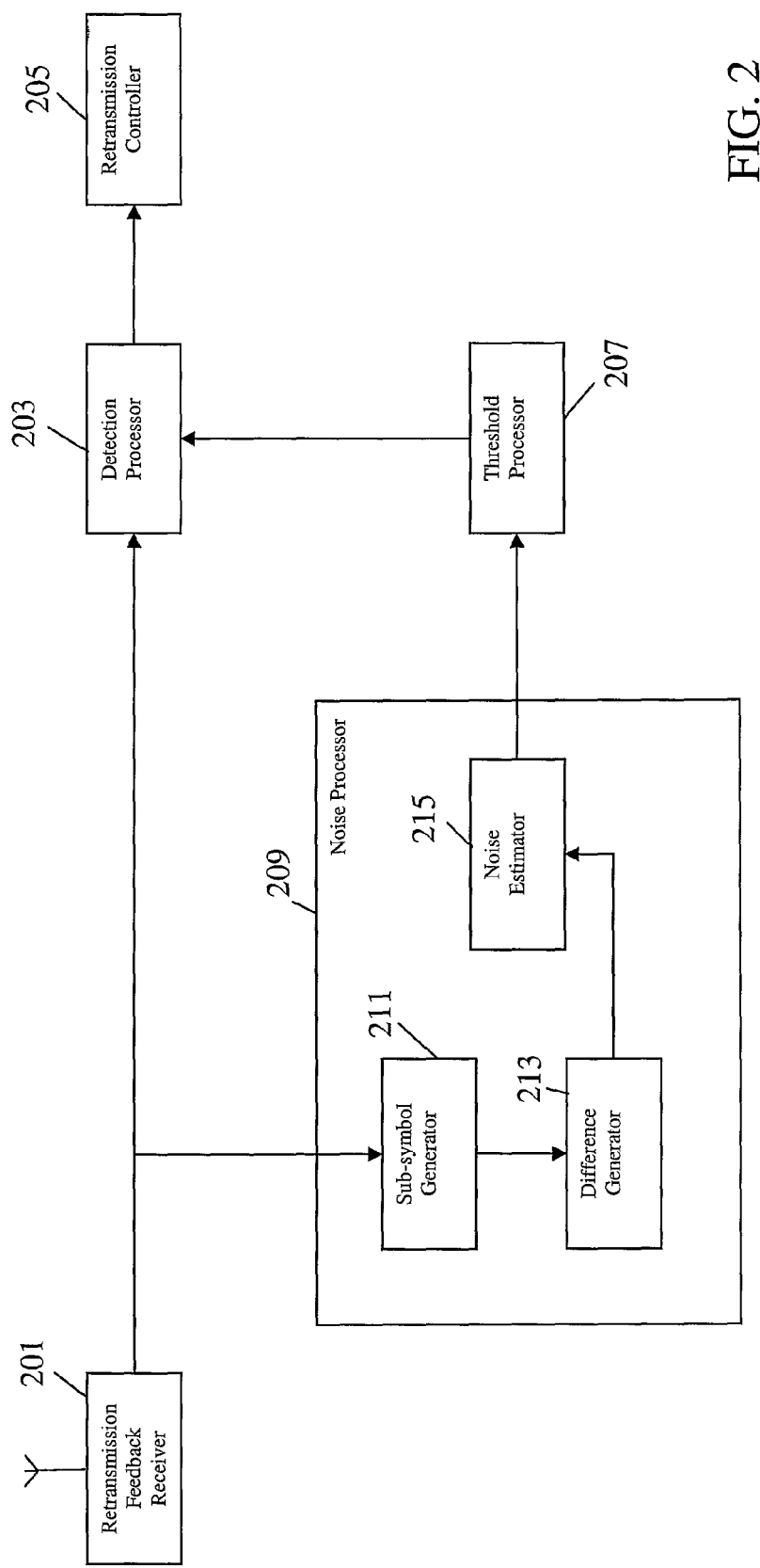
FIG. 2 illustrates elements of a base station in accordance with some embodiments of the invention.

FIG. 2 illustrates elements of a base station in accordance with some embodiments of the invention. Specifically, FIG. 2 illustrates elements of the first base station 103 which are associated with operating the Hybrid ARQ retransmission scheme for the HSDPA service.

The base station comprises a retransmission feedback receiver 201 which receives the ACK/NACK retransmission feedback messages from the first remote terminal 101. Specifically, the retransmission feedback receiver 201 is arranged to receive the HS-DPCCH and to extract the ACK/NACK symbols therefrom.

The retransmission feedback receiver 201 is coupled to the detection processor 203 which determines if the received retransmission feedback message is a retransmission request (a NACK message) or if no message was received (DTX). Thus, the detection processor 203 determines whether the received ACK/NACK message is an ACK message, a NACK message or no message (DTX). Alternatively the detection processor 203 may determine whether the received ACK/

NACK message is an ACK message or not (if not the message is either DTX or a NACK message).

The detection processor 203 is coupled to a retransmission controller 205 which controls the retransmission scheme in response to the received ACK/NACK messages. The operation of a Hybrid ARQ scheme in response to received retransmission feedback messages is known to the person skilled in the art and will for brevity not be discussed further herein.

The detection processor 203 determines the received ACK/NACK symbol by the spreading the received symbols by the appropriate spreading factor. Specifically, the ACK/NACK message comprising ten repeated ACK/NACK symbols is despread by a spreading factor of 2560 corresponding to a spreading factor of 256 for each symbol. The resulting symbol is compared to a detection threshold and the received ACK/NACK message is determined ("ACK" or "NACK/DTX") in response to the comparison. Alternatively the resulting symbol is compared to multiple detection thresholds and the received ACK/NACK message is determined ("ACK" if >Thresh1, or "NACK" if <Thresh2 or "DTX" otherwise).

The following description will specifically consider the application of a single detection threshold but it will be appreciated that multiple detection thresholds can be applied to e.g. detect between different ACK/NACK/DTX messages. Specifically, the ACK/NACK message is mapped to the binary values of +1 (ACK) and −1 (NACK) as illustrated in FIG. 3. The received and despread value is compared to the detection threshold and if the value is above the threshold an ACK message is determined and if it is below the threshold a NACK or DTX message is determined.

The performance of the retransmission scheme is highly dependent on a suitable detection threshold. As the adverse effect of detecting an ACK feedback when a NACK feedback or nothing was sent is much more severe than the adverse effect of detecting a NACK (or DTX) feedback when an ACK feedback is sent (the latter only leads to an unnecessary retransmission), the detection threshold for ACK is set asymmetrically towards the ACK. However, the optimal detection threshold depends on the specific channel and propagation conditions. In the apparatus of FIG. 2, the detection threshold is therefore dynamically adjusted in response to the noise of the HS-DPCCH.

Specifically, the detection processor 203 is coupled to a threshold processor 207 which determines a suitable detection threshold to be applied by the detection processor 203. The threshold processor 207 is coupled to a noise processor 209 which determines a noise estimate for the HS-DPCCH. The threshold processor 207 receives a noise estimate from the noise processor 209 and adjusts the detection threshold in response to this.

It will be appreciated that the threshold processor 207 may adjust the detection threshold in response to the noise estimate in accordance with any suitable function or algorithm. Specifically, it has been found that setting the detection threshold to a value of around three times the standard deviation of noise on the HS-DPCCH leads to advantageous performance.

In the specific example of FIG. 2, the HS-DPCCH is first despread with SF=32 in the retransmission feedback receiver 201. The ACK/NACK soft data is then obtained in the detection processor 203 by a final de-spread to SF=256, followed by coherent accumulation over all ten resulting soft symbols in the timeslot. Thus, the timeslot is effectively despread by SF=2560.

The ACK/NACK detection algorithm used by the detection processor 203 is then:

---

If soft_value > 0 and if soft_value$^2$ > ThreshD1
   ACK detected
   Else NACK detected

---

In this example, the soft value is squared before comparison in order to avoid a corresponding square root calculation for the threshold (which is generally a more complex operation than a multiplication).

The detection threshold value ThreshD1 is calculated by the threshold processor 207 based on the noise estimate from the noise processor 209. In the specific example, the noise processor 209 determines a noise estimate in the form of a variance estimate for the received noise signal on the HS-DPCCH.

The threshold ThreshD1 is then calculated as:

$$\text{Thresh}D1 = \text{thresh\_scale} * \text{scale\_value} * \text{variance\_est},$$

where thresh_scale is typically set to e.g. 9 for a detection threshold corresponding to 3*sigma (where sigma is standard deviation of noise) and where scale_value is a scale value that normalises the despreading used for the variance estimate and the soft symbol values of the received ACK/NACK symbols.

As will be described in the following, in the specific example, the variance is determined based on symbol pairs having an effective spreading factor of 40 and thus scale_value=40 (i.e. the value 40=2560/64 is the ratio of noise power on the final despread ACK/NACK with processing gain=2560 to the noise power on the difference symbol values (which have an effective spreading factor of SF=64).

The noise processor 209 comprises a sub-symbol generator 211 which divides the retransmission feedback symbols of the HS-DPCCH into a plurality of sub-symbols. Each of the sub-symbols are despread by a spreading code which has a lower spreading factor than the spreading factor of the retransmission feedback symbol. In a specific example, the spreading factor of the ACK/NACK symbols is 256 whereas each sub-symbol simple is generated using a spreading factor of 32.

For example, the spreading code used for a ACK/NACK symbol can be:
   1,1,−1,−1,1,1,−1,−1,1,1,1,−1,−1,1,1,1,−1,−1, . . . 1,1,−1,−1,
with a total of 256 values. Each sub-symbol can be generated using the spreading code:
   1,1,−1,−1,1,1,−1,−1, . . . 1,1,−1,−1,
with a total of only 32 values (but with the same chip rate). Thus, for each ACK/NACK symbol a total of 256/32=8 sub-symbols are generated.

In the example, the sub-symbols are directly generated by the retransmission feedback receiver 201 by applying the sub-symbol spreading code:
   1,1,−1,−1,1,1,−1,−1, . . . 1,1,−1,−1.
with a total of only 32 values. The detection processor 203 then performs the total de-spreading by summing the sub-symbols corresponding to the full 256 chip spreading code of
   1,1,−1,−1,1,1,−1,−1,1,1,1,−1,−1,1,1,1,−1,−1, . . . 1,1,−1,−1,
being applied. In this example, the division into sub-symbols by the sub-symbol processor 211 simply corresponds to individually receiving and processing the sub-symbols received from the retransmission feedback receiver 201.

The sub-symbol generator 211 is coupled to a difference generator 213 which generates difference symbol values between the plurality of sub-symbols. In the specific example, the difference generator 213 determines the difference symbol values as difference values between adjacent sub-symbols of the received feedback symbol.

Specifically, the difference generator 213 can for a given ACK/NACK symbol generate the following difference symbol values:

$$dif\ val_1 = sub\text{-}symbol_1 - sub\text{-}symbol_0$$

$$dif\ val_2 = sub\text{-}symbol_3 - sub\text{-}symbol_2$$

$$dif\ val_3 = sub\text{-}symbol_5 - sub\text{-}symbol_4$$

$$dif\ val_4 = sub\text{-}symbol_7 - sub\text{-}symbol_6$$

Each of these difference values thus correspond to the application of a spreading code of length 64 wherein the last 32 chips are sign inverted with respect to the first 32 chips. Consequently, the de-spreading applied to the difference values is orthogonal to the spreading code for the ACK/NACK symbols. Thus, the signal value of the ACK/NACK value is automatically suppressed.

Furthermore, as the spreading code applied to the ACK/NACK symbol is orthogonal to the spreading codes used by the user equipment for other communications, the spreading code of the difference values is also orthogonal to these communications and thus an efficient interference reduction is achieved.

The difference generator 213 is coupled to a noise estimator 215. The noise estimator 215 generates the noise estimate from the difference symbol values, and specifically the noise estimate it can be generated by a simple sum of the difference symbol values. Thus, one possible noise estimate can be determined as $$\text{Noise est} = abs(dif\ val_1) + abs(dif\ val_2) + abs(dif\ val_3) + abs(dif\ val_4)$$

A more accurate noise power estimate can be determined by determining the statistical variance of the difference symbol values. As the difference symbol values are zero mean, the variance is equivalent to the mean square of the difference symbol values.

Although the above example illustrated a noise estimate is determined from sub-symbols of a single ACK/NACK symbol, it will be appreciated that the noise estimate is preferably determined over a larger interval in order to obtain improved accuracy.

Specifically, difference symbol values can be determined for all ten ACK/NACK values of an ACK/NACK message, i.e. for all ten ACK/NACK values of a time slots of the HS-DPCCH. Accordingly, the ACK/NACK time slot can be used to generate 40 difference symbol values and the noise estimate can be generated from these 40 values.

In order to improve the accuracy of the determined noise estimate, the noise estimate can be based on sub-symbols generated for other symbols of the first channel than the retransmission feedback symbols. Specifically, sub-symbols can be generated for the time slots preceding the ACK/NACK time slot. For example, the time slot immediately preceding the ACK/NACK time slot can comprise a Channel Quality Indication (CQI) from the first remote terminal 101. Sub-symbols and difference symbol values can be generated for the CQI using the same approach as described above for the ACK/NACK symbol. The difference symbol values of both the CQI time slot and the ACK/NACK time slot can then be used to determine the variance and thus the noise estimate.

The noise estimate determination can be extended over a suitable number of HS-DPCCH time slots and/or symbols. Specifically, a number of HS-DPCCH timeslots and/or symbols immediately preceding the ACK/NACK time slot can be used. This may provide an accurate indication of the conditions at the time of the ACK/NACK time slot without necessitating a delay and thus allowing an ACK/NACK detection immediately at the end of the ACK/NACK time slot.

In some scenarios, the ACK/NACK information may be repeated in a plurality of ACK/NACK messages in different time slots. In such scenarios, the noise processor 209 can generate sub-symbol and difference symbol values for all of the ACK/NACK messages and can determined the variance based on all of these difference symbol values.

Specifically, the noise processor 209 can generate a noise estimate (e.g. a variance measure) for each ACK/NACK message individually and can subsequently determine a combined noise estimate by combining the individual noise estimates.

In such an example, the detection threshold can be determined as:

$$ThreshD1 = \text{thresh\_scale} * \text{scale\_value} * \sum_i \text{variance\_est}_i$$

where variance_est$_i$ is the variance estimate for the i'th ACK/NACK message.

The described embodiments can provide a reliable noise estimate which can improve the detection threshold used for detecting ACK/NACK retransmission feedback. Accordingly, a more accurate detection can be achieved resulting in improved retransmission performance and thus reduced error rates and reduced resource consumption.

Furthermore, the noise estimate can be generated by low complexity operations and with a low processing requirement. Specifically, the noise estimate can be obtained without requiring access to or separate determination of channel estimates etc.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An apparatus for operating a retransmission scheme in a cellular communication system, the apparatus comprising:
    means for receiving a retransmission feedback message on a first channel, the retransmission feedback message comprising at least one retransmission feedback symbol spread by a first spreading code having a first spreading factor;
    means for generating a noise estimate for the retransmission feedback symbol;
    threshold means for determining a detection threshold in response to the noise estimate; and
    determining means for determining if the received retransmission feedback message is a retransmission request in response to the detection threshold;
    and wherein the means for generating the noise estimate comprises
        sub-symbol generation means for dividing the retransmission feedback symbol into a plurality of sub-symbols, each sub-symbol being despread by a second spreading code having a second spreading factor smaller than the first spreading factor,
        difference means for generating difference symbol values between the plurality of sub-symbols, and
        estimate means for generating the noise estimate in response to the difference symbol values.

2. An apparatus as claimed in claim 1 wherein the determining means is arranged to combine the sub-symbols into a combined feedback symbol and to compare the combined feedback symbol to the detection threshold.

3. The apparatus claimed in claim 2 wherein the difference means is arranged to determine the difference symbol values as difference values between adjacent sub-symbols of the received feedback symbol.

4. The apparatus claimed in any claim 1 wherein the estimate means is arranged to determine a variance indication for the difference symbol values and to determine the noise estimate in response to the variance indication, and wherein the threshold means is arranged to determine the detection threshold by a scaling of the variance indication.

5. The apparatus claimed in claim 1 wherein the first spreading code is orthogonal to a sequence of alternating sign inverted second spreading codes.

6. The apparatus claimed in claim 1 wherein a sequence of alternating sign inverted second spreading codes is orthogonal to spreading codes used for other channels of a user equipment of the first channel.

7. The apparatus claimed in claim 1 wherein the sub-symbol generation means is arranged to generate sub-symbols for other symbols of the first channel than retransmission feedback symbols, and wherein the other symbols consists in a given number of symbols of the first channel preceding the retransmission feedback message.

8. The apparatus of claim 7 wherein the sub-symbol generation means is arranged to generate sub-symbols for a plurality of received retransmission feedback symbols of the retransmission feedback message, and the estimate means is arranged to generate the noise estimate in response to the difference symbol values for the sub-symbols of the plurality of received retransmission feedback symbols.

9. The apparatus of claim 8 wherein the threshold means is arranged to determine the detection threshold for one retransmission feedback message in response to noise estimates for a plurality of retransmission feedback messages in different time slots.

10. A method of operating a retransmission scheme in a cellular communication system, the method comprising:
    receiving a retransmission feedback message on a first channel, the retransmission feedback message comprising at least one retransmission feedback symbol spread by a first spreading code having a first spreading factor;
    generating a noise estimate for the retransmission feedback symbol;
    determining a detection threshold in response to the noise estimate; and
    determining if the received retransmission feedback message is a retransmission request in response to the detection threshold;
    and wherein generating the noise estimate comprises
        dividing the retransmission feedback symbol into a plurality of sub-symbols, each sub-symbol being despread by a second spreading code having a second spreading factor smaller than the first spreading factor,
        generating difference symbol values between the plurality of sub-symbols, and
        generating the noise estimate in response to the difference symbol values.

* * * * *